Figure 1:
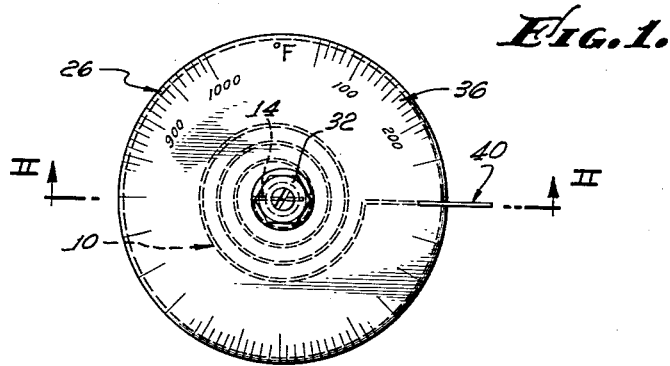

Jan. 9, 1962  G. A. ARGABRITE  3,015,955
SURFACE THERMOMETER
Filed Feb. 18, 1957

GEORGE A. ARGABRITE
INVENTOR.

BY
ATTORNEY.

United States Patent Office 3,015,955
Patented Jan. 9, 1962

3,015,955
SURFACE THERMOMETER
George A. Argabrite, North Hollywood, Calif., assignor to Pacific Transducer Corporation, Los Angeles, Calif., a corporation of California
Filed Feb. 18, 1957, Ser. No. 640,669
4 Claims. (Cl. 73—363.7)

This invention relates generally to improvement in temperature measuring devices and is particularly directed to a thermometer for quickly indicating a high temperature of the surface of a specimen.

The device of the present invention is especially adapted for the measurement of temperatures of 1000° F. and higher. Conventional thermometers for measuring in this temperature range normally include a number of relatively moving surfaces or parts. After repeated exposure to high temperatures, the relatively moving parts tend to become oxidized or otherwise affected in such a way as to substantially increase their frictional relationship. As a result, devices of this nature fall out of calibration and may even become totally inoperative after a relatively short life.

The present construction overcomes these disadvantages in that it employs no relatively moving parts in frictional contact. Moreover, desirably the entire device is made of materials highly resistant to oxidization at high temperatures so that repeated or continuous exposure to high temperatures will not be harmful to the device.

According to the preferred construction of the present device as described and illustrated hereinafter, there is provided a spirally coiled bimetallic strip having at least its lower edge disposed in a plane and adapted to be in direct contact with the surface of the specimen whose temperature is being measured. An upright post is fixed to the inner end of the bimetallic strip, preferably by means of a diametrical slot formed in the lower portion of the post into which the inner end of the bimetallic strip may be forceably driven during assembly. A dial is fixed to the upper portion of the upright post, desirably by a lock nut and washer, thus facilitating economical manufacture and at the same time permitting ease of calibration when desired. The outer end of the spirally formed strip is provided with an outwardly projecting pointer in visual indicating relationship with arcuately arranged indicia on the dial. In operation, the indicating pointer normally remains virtually fixed in position, while the center post and indicating dial are rotated under the force of the bimetallic strip.

In one form of the invention the dial may be made of a suitable transparent material so that the user may see the posititon of the pointer through the dial. In another form the pointer extends beyond the dial and many include an element extending around and above the outer edge of the dial.

Although primarily intended to measure the temperature of a flat surface, the present meter will respond within acceptable limits of accuracy in measuring the temperature of a curved surface, providing such surface is not too sharply curved. The indication of the meter is very rapidly attained and is virtually completely independent of ambient temperature.

Accordingly, the objects of the invention are to provide a temperature indicating device having a spirally coiled bimetallic strip adapted to contact the surface of a specimen along the edge of the strip; to provide such a device with an indicia-bearing dial fixed to the center of the strip; to disclose a device of the character referred to which responds very quickly to the temperature of the specimen; to disclose a device having no relatively moving parts in frictional contact with one another; and to disclose such a device of remarkable facility and economy in manufacture and assembly.

Figure 2:
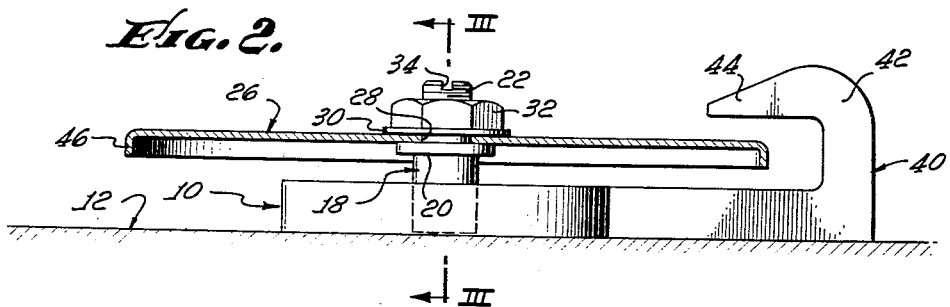
Figure 4:
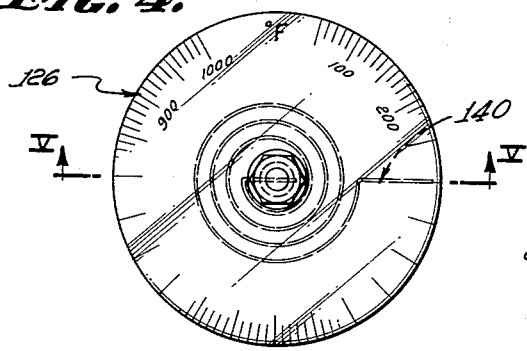
Figure 3:
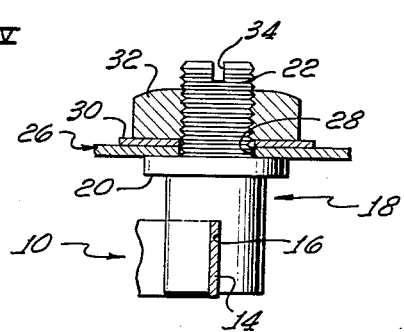
Figure 5:
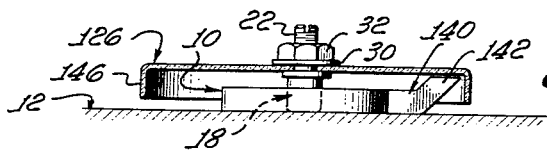

These and other allied objects and purposes of the invention will be understood by a study of the following description of illustrative forms thereof taken in connection with the accompanying drawings, in which:

FIG. 1 is a preferred embodiment of the invention;
FIG. 2 is a sectional view taken on line II—II of FIG. 1;
FIG. 3 is a fragmentary sectional view taken on line III—III of FIG. 2;
FIG. 4 is a plan view of a modified form of the invention, including a transparent dial;
FIG. 5 is a sectional view taken on line V—V of FIG. 4.

In the preferred form of the invention shown in FIGS. 1 and 2, a temperature responsive element is indicated generally at 10, and in the present illustrative form of the invention constitutes a spirally coiled bimetallic strip, the lower edge of the strip being disposed in a substantially planar configuration and resting upon the surface of a specimen indicated at 12 whose temperature is to be measured. The center of the bimetallic strip 10 is flattened as seen at 14, and the flattened portion is received and retained in a vertically disposed diametrical slot 16 formed in the lower end of an upright central post indicated generally at 18 (see FIG. 3). Post 18 is provided with an annular shoulder 20 and above the shoulder is threaded as indicated at 22.

A dial having a flat surface is indicated generally at 26 and is provided with a central aperture 28 through which the threaded portion 22 of post 18 extends. Thus the dial is supported upon the upper surface of the annular shoulder 20. The dial is retained in position by suitable means here shown as including a washer 30 and a nut 32 threadedly engaging the portion 22 of the post. A diametrical slot 34 is desirably provided in the post for convenience in calibration as explained hereinafter.

Upon the dial 26 there are arranged circumferentially temperature indicating indicia referred to generally at 36 and graduated over the predetermined range of the instrument. The outer end of the temperature responsive element 10 is provided with an outwardly projecting indicating pointer indicated generally at 40 which is in visual indicating relation with the temperature indicia 36. In the form of the invention shown in FIG. 2, there is desirably provided an upward portion 42 of the pointer and an inwardly extending arm 44 overlying the outer edge of the dial 26. Dial 26 may itself be provided with a downturned peripheral flange 46 in order to partially shield the temperature responsive element 10 from ambient temperature and to contribute stiffness and strength to the dial 26.

In the alternative form of the invention shown in FIGS. 4 and 5, there is provided a dial indicated at 126 made of a suitable transparent material such as Pyrex, heat-resistant p'astic or the like. This form of the invention includes the temperature responsive element indicated generally at 10 and assuming the form of a spirally coiled bimetallic strip having its center attached to an upright post indicated generally at 18 as in the previously described form of the invention. Dial 126 is provided with a central aperture through which the threaded portion 22 of post 18 extends, and the dial 126 is retained in position by a washer 30 and nut 32. Dial 126 may be provided with a re'atively deep downturned peripheral lip or flange 146 and in this form of the invention the outwardly extending indicating pointer indicated generally at 140 carried by the outer end of the temperature responsive element 10 may terminate in an upwardly directed portion 142 disposed immediately beneath the dial 126.

To facilitate accuracy and economy in manufacture, the diametrical slot 16 of the post 18 is designed with such width as to receive the flattened portion 14 of the temperature responsive element in a drive fit. Thus the parts can be assembled easily, keeping the axis of the post 18 perpendicular to the plane formed by the lower edge of the temperature responsive element 10. The dial 26 or 126 may then be assembled so that the lower surface of the dial rests upon the annular shoulder 20 of the post, the dial being retained on the post by the washer and nut 30 and 32, previously referred to. It is to be especially noted that the instrument can be quickly calibrated, either initially during manufacture or subsequently if the device falls out of calibration, by loosening the retaining nut 32 and, by means of a screw driver blade or similar tool in the slot 34, rotating the temperature responsive element 10 by means of the post 18 relative to the dial 26 or 126. With the retaining nut 32 then retightened, the device is ready for use. It is to be especially noted that the present instrument, in both of the forms hereinabove illustrated and described, includes no relatively moving surfaces between which friction may develop during use. In normal operation, the outwardly extending indicating pointer 40 or 140 tends to remain fixed, with central part of the temperature responsive element 10 rotating about the axis of post 18 and thereby moving the post and the dial as a result of such rotation.

Accordingly it will be seen that there is here provided a temperature indicating device particularly adapted for rapidly indicating the temperature of a surface of a specimen and well adapted to withstand continuous use at relatively high temperatures since no relatively moving parts are embodied therein.

Modifications and changes from the specific forms of the invention herein discussed are within my contemplation and are intended to be embraced within the scope of the appended claims.

I claim:

1. A surface thermometer comprising: a temperature responsive element adapted to contact the surface of a specimen along a plane and consisting of a bimetallic strip including a central portion having a spiral lower edge lying in said plane and an indicating arm having its lower edge lying in the plane along a generally radial line extending substantially from the central portion; and a dial bearing spaced temperature indicia thereon and carried on the inner end of said strip and lying in a plane spaced above and parallel to the first plane, the outer portion of said arm being in visual indicating relation with said indicia.

2. The invention as stated in claim 1 wherein said dial is transparent.

3. The invention as stated in claim 1 wherein said indicating arm extends outwardly beyond the dial.

4. The invention as stated in claim 3 wherein the outer portion of the arm includes an indicating pointer extending inwardly above the dial.

References Cited in the file of this patent

UNITED STATES PATENTS

| | | |
|---|---|---|
| 1,637,805 | Chace | Aug. 2, 1927 |
| 1,684,788 | Bell | Sept. 18, 1928 |
| 1,712,653 | Egloff | May 14, 1929 |
| 2,310,503 | Widmer | Feb. 9, 1943 |
| 2,701,964 | Argabrite | Feb. 15, 1955 |

FOREIGN PATENTS

| | | |
|---|---|---|
| 816,606 | France | May 3, 1937 |
| 893,840 | France | Feb. 28, 1944 |